United States Patent
Sturek (10) Patent No.: US 11,324,075 B2
(45) Date of Patent: May 3, 2022

(54) TECHNIQUES FOR MULTI-DATA RATE COMMUNICATIONS

(71) Applicant: ITRON, INC., Liberty Lake, WA (US)

(72) Inventor: Donald Eugene Sturek, Liberty Lake, WA (US)

(73) Assignee: ITRON, INC., Liberty Lake, WA (US)

( * ) Notice: Subject to any disclaimer, the term of this patent is extended or adjusted under 35 U.S.C. 154(b) by 37 days.

(21) Appl. No.: 16/868,401

(22) Filed: May 6, 2020

(65) Prior Publication Data

US 2021/0195684 A1    Jun. 24, 2021

Related U.S. Application Data

(60) Provisional application No. 62/950,908, filed on Dec. 19, 2019.

(51) Int. Cl.
| | | |
|---|---|---|
| *H04W 84/18* | (2009.01) | |
| *H04W 88/06* | (2009.01) | |
| *H04W 40/24* | (2009.01) | |
| *H04W 40/02* | (2009.01) | |

(52) U.S. Cl.
CPC .......... *H04W 84/18* (2013.01); *H04W 40/02* (2013.01); *H04W 40/24* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,778,262 B2 * | 8/2010 | Beagley | H04L 69/08 370/401 |
| 2007/0038743 A1 * | 2/2007 | Hellhake | H04L 29/12283 709/224 |
| 2007/0258508 A1 | 11/2007 | Werb et al. | |
| 2012/0106528 A1 * | 5/2012 | Estevez | H04W 88/06 370/338 |

(Continued)

OTHER PUBLICATIONS

International Search Report for application No. PCT/US2020/065112 dated Mar. 11, 2021.

(Continued)

*Primary Examiner* — Brian S Roberts
(74) *Attorney, Agent, or Firm* — Artegis Law Group, LLP (57) ABSTRACT

Various embodiments disclose a computer-implemented method for transmitting data between node devices in a mesh network comprising receiving, by a first node device within the mesh network that supports a first set of communication modes, a first information element that specifies a second set of communication modes supported by a second node device within the mesh network, determining, based on the first information element, a common set of communication modes that includes at least a default mode and a first mode, where each communication mode included in the common set of communication modes is supported by both the first node device and the second node device, selecting, from the common set of communication modes, the first mode as a first preferred communication mode for data transmissions between the first node device and the second node device, and configuring a communication link between the first node device and the second node device according to the first mode.

20 Claims, 5 Drawing Sheets

(56) References Cited

U.S. PATENT DOCUMENTS

| | | |
|---|---|---|
| 2014/0036702 A1 | 2/2014 | Van Wyk et al. |
| 2015/0200846 A1 | 7/2015 | Hui et al. |
| 2015/0264677 A1 | 9/2015 | He et al. |
| 2016/0149762 A1 | 5/2016 | Seibert et al. |
| 2018/0255495 A1 | 9/2018 | Dietrich |

OTHER PUBLICATIONS

Kivinen, et al.; IEEE 802.15.4 Information Element for the IETF; dated May 2017; 7 pages.

* cited by examiner

| Mode # | Data Rate (bps) | Modulation |
|---|---|---|
| 0 | 50K | 2 FSK |
| 1 | 100K | 2 FSK |
| 2 | 150K | 2 FSK |
| 3 | 300K | 2 FSK |
| 6 | 150K | OFDM 4 |
| 7 | 200K | OFDM 4 |
| 8 | 300K | OFDM 4 |
| 9 | 600K | OFDM 3 |
| 10 | 800K | OFDM 1 |
| 11 | 1200K | OFDM 1 |
| 12 | 2400K | OFDM 1 |

| Mode in Use | Mode # |
|---|---|
| Default | 2 |
| 1 | 3 |
| 2 | 9 |

TECHNIQUES FOR MULTI-DATA RATE COMMUNICATIONS

CROSS-REFERENCE TO RELATED APPLICATIONS

This application claims priority benefit of the U.S. Provisional patent application titled, "INFORMATION ELEMENTS FOR MULTI-DATA RATE COMMUNICATION," filed on Dec. 19, 2019 and having Ser. No. 62/950,908. The subject matter of this related application is hereby incorporated herein by reference.

BACKGROUND

Field of the Various Embodiments

The various embodiments relate generally to mesh networks and communications across mesh network and, more specifically, to techniques for multi-data rate communications.

Description of the Related Art

A wireless mesh network includes a plurality of nodes that are configured to communicate with and transmit data to one another using one or more communication protocols. In lieu of using a hierarchal topology, individual nodes within a wireless mesh network establish direct connections with other nodes within the network in order to efficiently route data to different locations in the network. The different nodes within a wireless mesh network usually implement various techniques to route data through the network. For example, a given node could identify neighboring nodes within the network and establish communication links with (or "pair" with) some or all of those neighboring nodes. Once the given node forms communication links with neighboring nodes, the given node can route data within the network via one or more of those communication links.

A given wireless mesh network typically includes nodes that have varying capabilities and operating parameters. For example, a wireless mesh network could include one or more legacy nodes that are capable of routing data packets at only low data rates or are capable of selecting a channel hopping sequence that includes only a limited range of channels. The same wireless mesh network also could include one or more newer nodes that have more advanced operating features, such as communication modes that route data packets at higher data rates or the ability to select channel hopping sequence that employ a wider range of channels.

One drawback of conventional wireless mesh networks is that, when these networks include nodes having different capabilities, oftentimes the nodes with greater capabilities are throttled down to the capability level of the nodes in the network with lesser capabilities. For example, in order to ensure interoperability between newer nodes and legacy nodes within a given mesh network, the newer nodes could be forced to use the operating parameters that the legacy nodes are capable of handling. In this regard, if a legacy node were capable of transmitting data packets at 300 Kilobits per second (Kbps), while a new node were capable of transmitting data packets at 2 Megabits per second (Mbps), then the mesh network could be configured such that the new node always has to transmit data packets at 300 Kbps, even over a communication link established between two new nodes. Imposing such limitations on the greater capability nodes within a mesh network inhibits the overall operating efficiency of the network and can preclude the network from being able to handle certain applications or communications protocols that require higher data rates and other advanced capabilities.

Another drawback of conventional wireless mesh networks that include nodes with different capabilities is that the structural integrity and efficacy of the overall network can be compromised. For example, a new node could be configured to transmit messages using a header format that legacy nodes within the mesh network that use a different header format are unable to recognize. As a result, the new node would be unable to establish communication links with any of the legacy nodes.

As the foregoing illustrates, what is needed in the art are more effective ways to control communications between nodes within a mesh network.

SUMMARY

Various embodiments disclose a computer-implemented method for transmitting data between node devices in a mesh network comprising receiving, by a first node device within the mesh network that supports a first set of communication modes, a first information element that specifies a second set of communication modes supported by a second node device within the mesh network, determining, based on the first information element, a common set of communication modes that includes at least a default mode and a first mode, where each communication mode included in the common set of communication modes is supported by both the first node device and the second node device, selecting, from the common set of communication modes, the first mode as a first preferred communication mode for data transmissions between the first node device and the second node device, and configuring a communication link between the first node device and the second node device according to the first mode.

One technical advantage of the disclosed techniques relative to the prior art is that node devices within a mesh network with greater capabilities are able to dynamically adjust the communications mode being used to connect to other node devices within the network. In this regard, a given node device is able to adjust the communication mode used to connect to a neighboring node device based on the capabilities of the neighboring node device. Thus, a node device with greater operating capabilities is able to establish a communication link with a similar node device and transmit data according to those greater operating capabilities and is able to establish a communication link with a legacy node device having lesser operating capabilities and transmit data according to those lesser operating capabilities. Accordingly, the overall operating efficiency of the mesh network can be substantially increased relative to conventional mesh networks. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
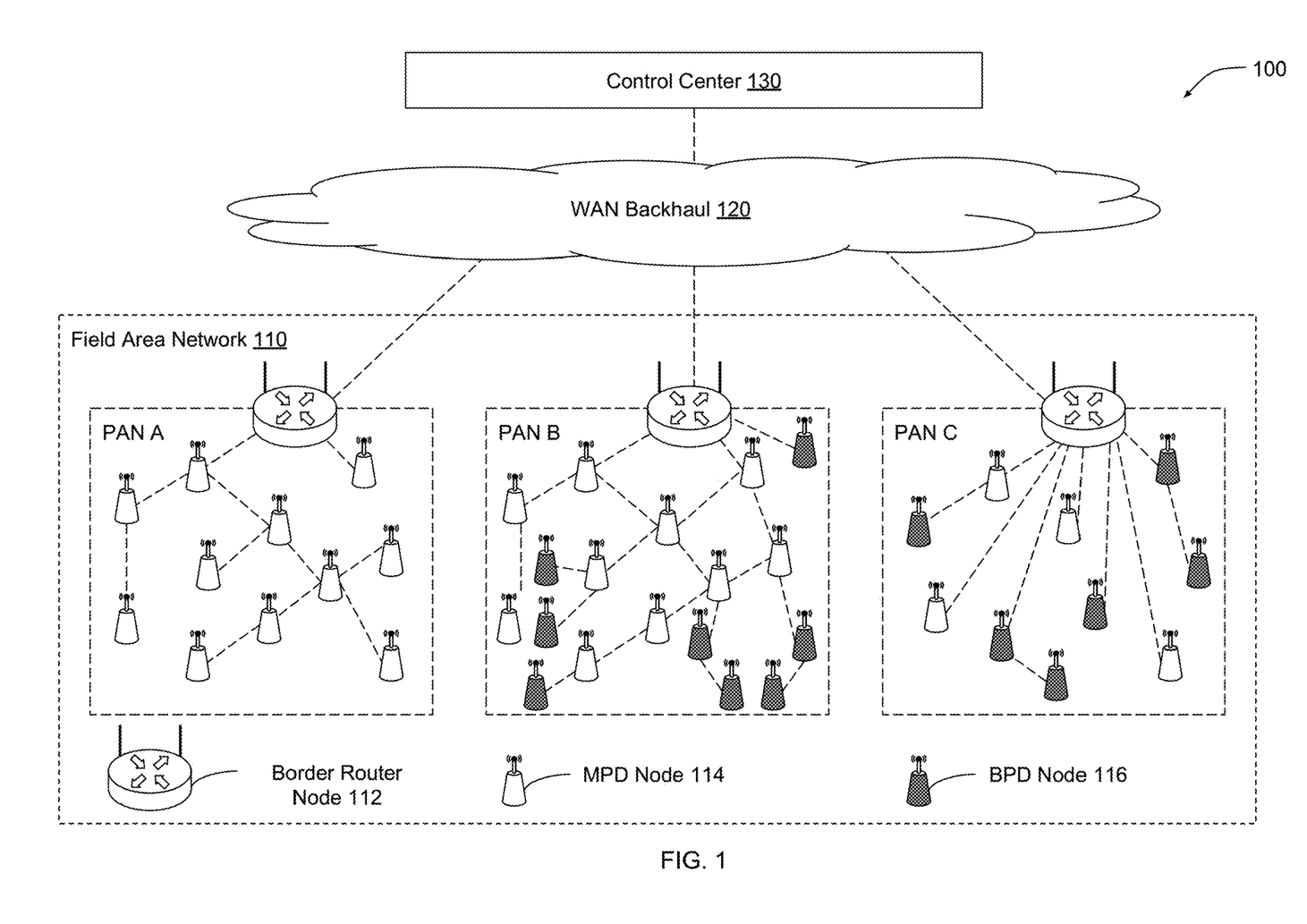
FIG. 1 illustrates a network system configured to implement one or more aspects of the various embodiments.

FIG. 1 illustrates a network system configured to implement one or more aspects of the various embodiments. As shown, network system 100 includes field area network (FAN) 110, wide area network (WAN) backhaul 120, and control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, may power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices via bi-directional communication links. In various embodiments, a given communication link may be wired or wireless links, although in practice, adjacent node devices of a given PAN exchange data with one another by transmitting data packets via wireless radio frequency (RF) communications. The various node types are configured to perform a technique, known in the art as "channel hopping," in order to periodically receive data packets on varying channels. As known in the art, a "channel" may correspond to a particular range of frequencies. In one embodiment, a node device may compute a current "receive" channel by evaluating a Jenkins hash function that is based on a total number of channels, the media access control (MAC) address of the node device, and/or other information associated with the node device.

In various embodiments, each node device within a given PAN may implement a discovery protocol to identify one or more adjacent node devices or "neighbors." In such instances, a node device that has identified an adjacent, neighboring node device may establish a bi-directional communication link with the neighboring node device. Each neighboring node device may update a respective neighbor table to include information concerning the other node device, including the MAC address of the other node device, as well as a received signal strength indication (RSSI) of the communication link established with that node device. In various embodiments, the neighbor table may include information about one or more communication modes that the neighbor mode is capable of supporting, such as the operating parameters (e.g., data rates, modulation scheme, channel spacing, frequencies supported, etc.).

Node devices may compute the channel hopping sequences of adjacent node devices in order to facilitate successful transmission of data packets to such node devices. In embodiments where node devices implement the Jenkins hash function, a node device may compute a "current receive" channel of an adjacent node device using the total number of channels, the MAC address of the adjacent node device, and/or a time slot number assigned to a current time slot of the adjacent node device.

Any of the node devices discussed above may operate as a source node device, an intermediate node device, or a destination node device for the transmission of data packets. In some embodiments, a given source node device may generate a data packet and then transmit the data packet to a destination node device via any number of intermediate node devices (in mesh network topologies). In such instances, the data packet may indicate a destination for the packet and/or a particular sequence of intermediate node devices to traverse in order to reach the destination node device. In some embodiments, each intermediate node device may include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes may exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines may query node devices within network system 100 to obtain various data, including raw and/or processed sensor data, power consumption data, node/network throughput data, status information, and so forth. The server machines may also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

Figure 2:
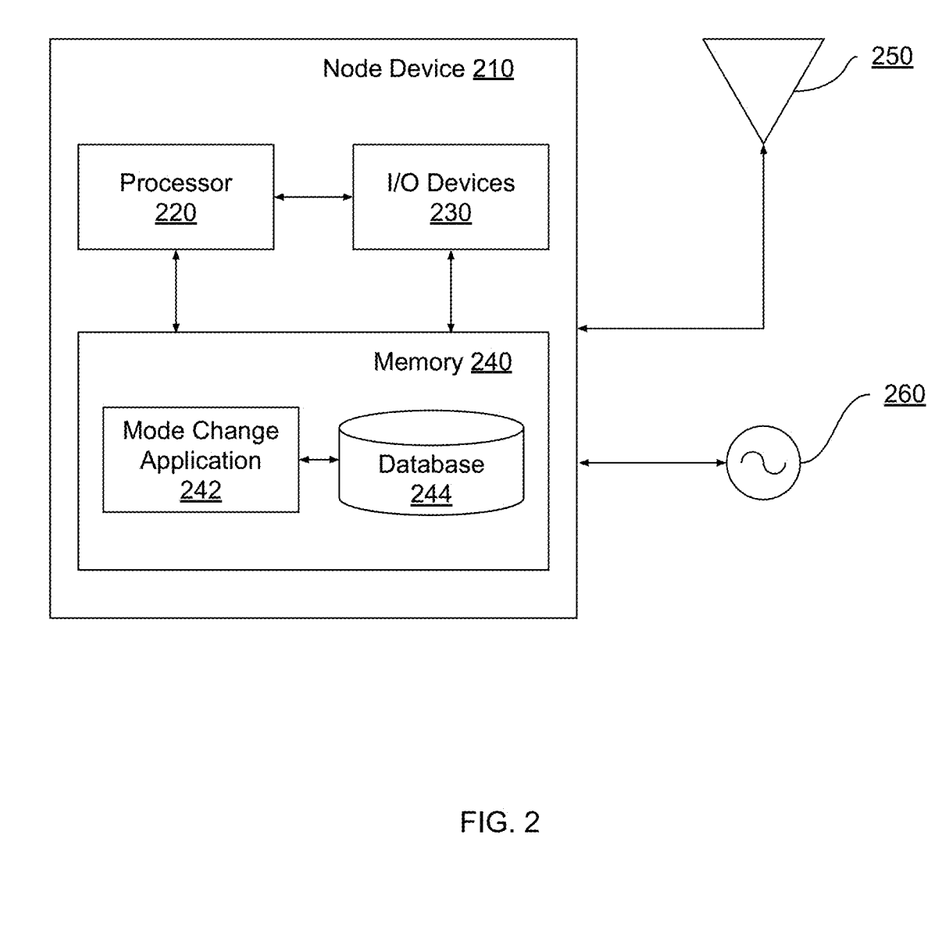
FIG. 2 illustrates a node device configured to transmit and receive data within the network system of FIG. 1, according to various embodiments.

In various embodiments, node devices 112, 114, 116 may likewise include computing device hardware configured to perform processing operations and execute program code. Each node device may further include various analog-to-digital (ND) converters, digital-to-analog (D/A) converters, digital signal processors (DSPs), harmonic oscillators, transceivers, and/or any other components generally associated with RF-based communication hardware. FIG. 2 illustrates an exemplary node device that may operate within the network system 100.

FIG. 2 illustrates a node device configured to transmit and receive data within the network system of FIG. 1, according to various embodiments. As shown, node device 210 is coupled to transceiver 250 and oscillator 260. Node device 210 includes processor 220, input/output devices 230, and memory 240. Memory 240 includes one or more applications (e.g., mode change application 242) that communicate with database 244.

Node device 210 coordinates the operations of node device 210. Transceiver 250 is configured to transmit and/or receive data packets and/or other messages across network system 100 using a range of channels and power levels. Oscillator 260 provides one or more oscillation signals, according to which, in some embodiments, node device 210 may schedule the transmission and reception of data packets. In some embodiments, node device 210 may be used to implement any of border router node devices 112, MPD node devices 114, and/or BPD node devices 116 of FIG. 1.

Node device 210 includes a processor 220, input/output (I/O) devices 230, and memory 240, coupled together. In various embodiments, processor 220 may include any hardware configured to process data and execute software applications. Processor 220 may include a real-time clock (RTC) (not shown) according to which processor 220 maintains an estimate of the current time. The estimate of the current time may be expressed in Universal Coordinated Time (UTC), although any other standard of time measurement can also be used. I/O devices 230 include devices configured to receive input, devices configured to provide output, and devices configured to both receive input and provide output. Memory 240 may be implemented by any technically-feasible computer-readable storage medium.

Memory 240 includes one or more software applications (e.g., mode change application 242) and database 244, coupled together. The one or more software applications includes program code that, when executed by processor 220, may performs any of the node-oriented computing functionality described herein. The one or more software applications may also interface with transceiver 250 to coordinate the transmission and/or reception of data packets and/or other messages across network system 100, where the transmission and/or reception is based on timing signals generated by oscillator 260. In various embodiments, memory 240 may be configured to store protocols used in communication modes, equations and/or algorithms for identifying metric values, constants, data rate information, and other data used in identifying metric values, etc.

In operation, mode change application 242 implements various techniques to optimize communications with one or more linked node devices, such as a neighboring node device. In various embodiments, node device 210 may be configured to, using a plurality of different communication modes, transmit data messages to the linked node device and/or receive data messages from the linked node device by selecting a common communication mode that is supported by node device 210 and the linked node device.

A communication mode may be defined by one or more operating parameters, such as settings or characteristics that affect data transmissions made to or from node device 210, such as by varying in speed, bandwidth, protocol, technology used, etc. For example, node device 210 operating in a first communication mode could transmit data packets with a 100 kilobits-per-second (kbps) bandwidth using minimum shift keying (MSK), while node device 210 operating in a second communication mode could transmit data packets with a 300 kbps bandwidth using Gaussian minimum shift keying (GMSK). In various embodiments, mode change application 242 may select one or more particular communication modes (e.g., a "common mode set") from a plurality of possible communication modes supported by the node device 210 and the linked node device.

Information Elements for Multi-Data-Rate Communications

Figure 3:
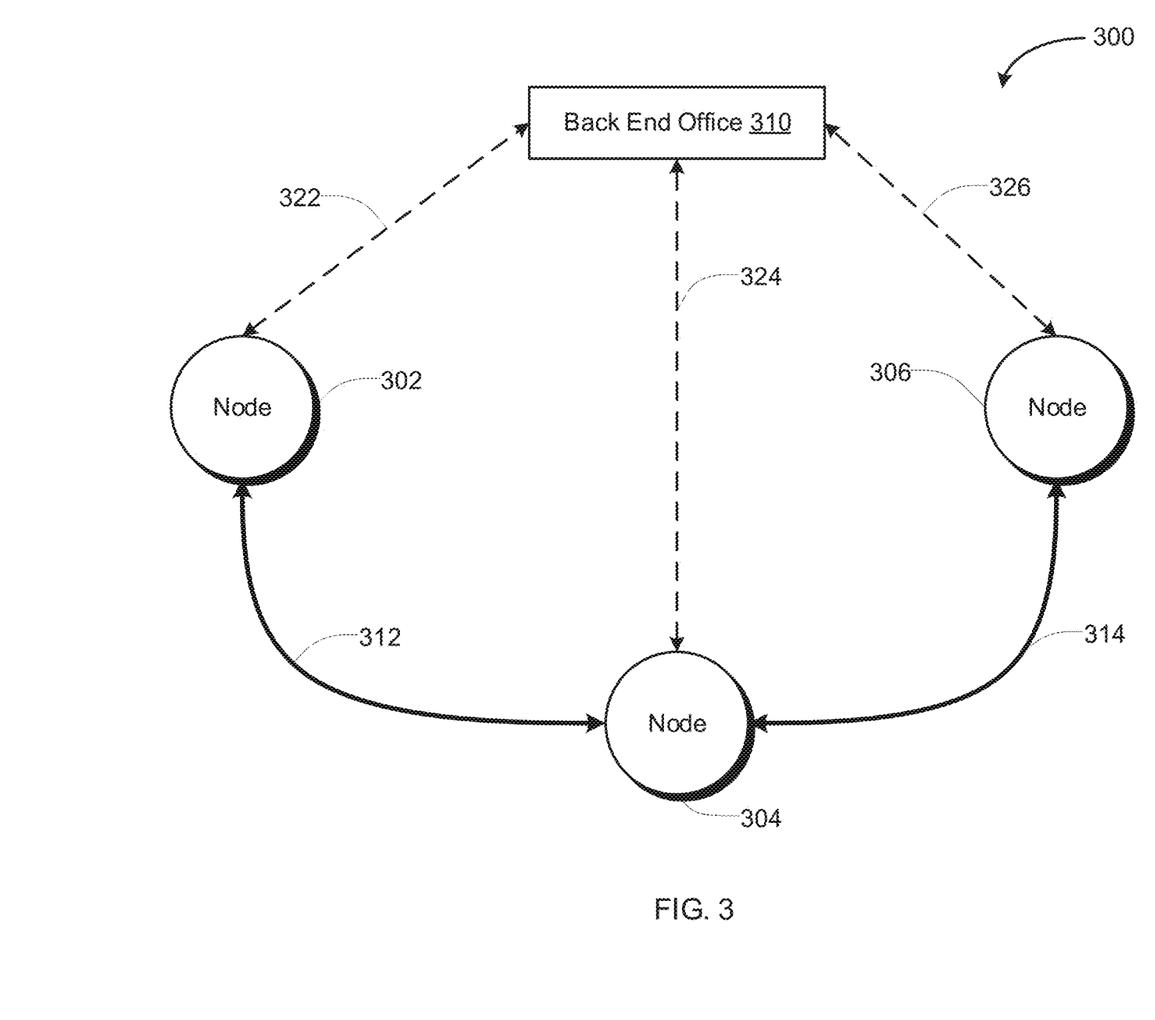
FIG. 3 illustrates how neighboring node devices within the network system of FIG. 1 establish communication links for transmitting data, according to various embodiments.

FIG. 3 illustrates how neighboring node devices within the network system of FIG. 1 establish communication links for data transmission, according to various embodiments. As shown, network 300 includes communication node devices 302, 304, 306 and back office system 310. Communication links 322, 324, 326 are established between communication node devices 302, 304, 306 and back office system 310. Communication links 312, 314 are established between communication node devices 302, 304, 306 for transmission of data packets from a source node device to a destination node device.

In operation, a given communication node device 304 may establish a communication link 312 with a neighboring node device (e.g., node device 302) by selecting a communication mode that is supported by each node device 302, 304. In various embodiments, mode change application 242 may select the communication mode from a plurality of potential communication modes by evaluating various operating parameters and/or metric values associated with each of the potential communication modes.

In various embodiments, each communication node device 302, 304, 306 may maintain a mode table that is stored in memory 240, database 244, and/or other suitable storage medium of communication node device 302, 304, 306. The mode table (not shown) is a data table used to store data regarding communication modes, including at least a plurality of communication modes that may be used by the communication node device 302, 304, 306. In various embodiments, the mode table may only store data for the communication modes usable by a given communication node device 304. Alternatively, the mode table may store data for all communication modes, such as may be included in a global mode table.

The mode table stores data associated with each of the communication modes a given communication node device is capable of implementing. For example, data included in an entry for a given communication mode in the mode table could include operating parameters of the given communication mode, as well as a data success rate indicative of successful transmissions that were made to and/or from the given node device using the given communication mode. In various embodiments, the mode table may also include a unique identifier (UID) associated with each communication mode. The UID may be any suitable type of value (e.g., numeric, alphanumeric, hexadecimal, etc.) that is unique to the specific communication mode among a plurality of all potential communication modes.

In some embodiments, each of communication node devices 302, 304, 306 may communicate, either directly or indirectly (e.g., via one or more other communication node devices), with back office system 310 via communication links 322, 324, 326. Back office system 310 maintains a global mode table (not shown) for one or more node devices 302, 304, 306 included in network 300. In various embodiments, the global mode table may store data for each communication mode supported by any communication node device 302, 304, 306 in network 300. In some embodiments, a communication node device 306 may only locally store data for communication modes through which communication node device 306 may communicate. In other embodiments, each communication node device 302, 304, 306 may locally store the global mode table, where each node device 302, 304, 306 receives the global mode table from back office system 310 and/or receives updates to the global mode table from back office system 310 via communication links 322, 324, 326.

In various embodiments, a given communication node device 304 may identify, from a set of all communication modes, one or more communication modes that are supported by a given neighboring node device 302 to generate a common mode set. Communication node device 304 may then select, from the common mode set, one or more communication modes (e.g., a "selected mode set") that are to be used when communicating with a neighboring communication node device 302, 304, 306. For example, when establishing communication link 312 with neighboring node device 302, node device 304 could use entries included in the local mode table to identify each communication mode supported by neighboring node device 302. In some instances, node device 304 could determine a metric value for each of the supported communication modes. In such instances, node device 304 could use the metric values when selecting the communication modes that are be used for communication link 312.

When establishing a communication link 312, 314 for data transmission, each communication node device 302, 304, 306 initially transmits messages with other node devices using a default communication mode ("default mode"). The default mode acts as a baseline channel plan and operating mode for node devices 302, 304, 306 included in network 300. In such instances, discovery communications, a broadcast schedule, and/or a listening schedule may adhere to the default mode.

In various embodiments, node device 304 may discover neighboring node devices and may establish a communication link with the neighboring node device. In such instances, node device 304 and the linked node device may implement multi-data-rate communications to in order to achieve better link statistics by increasing or decreasing the data rate of communications between the respective node devices. In some embodiments, mode change application 242 may include one or more information elements (IEs) in messages to one or more neighboring node devices. Inclusion of one or more IEs allows a given node device 304 to include additional information with various messages, such as data messages, acknowledgement messages, and/or discovery frames.

For example, communication node device 304 could discover node device 302 as a new neighboring communication node device. In some instances, node device 304 could electronically transmit to node device 302, using the default mode, at least the UID for each communication mode supported by node device 304. In some instances, node device 304 could receive a message originating from node device 302, where the message includes the UID for each communication mode supported by node device 302. In some instances, node devices 302, 304, could also exchange UIDs for communication modes that each respective node device could use for listening (e.g., receiving data messages, even if the communication mode is not used to transmit data messages), channels on which the communication node devices 302, 304 may operate, as well as data indicating if the communication node device 302, 304 supports any particular technology, protocol, etc., which may be used in communications.

After the data has been exchanged, each of the communication node devices 302, 304 store the data received from the other node device in local memory. For example, node device 304 could store the UIDs of communication modes supported by node device 302 in a local mode table. In some embodiments, communication node device 304 may identify a metric value for each communication mode supported by neighboring communication node device 304.

In various embodiments, the metric value may be identified using a data success rate for a given communication mode. In some embodiments, the data success rate may be an estimate based on communications of node device 304 with other node devices (e.g., node device 306), data received from back office system 310, and/or or other considerations. Additionally or alternatively, the data success rate may initially be a computed estimate based on earlier communications, and node device 304 may then update the data success rate based on exchanged communications with neighboring communication node device 302 that used the applicable communication mode.

In some embodiments, the metric value may be computed from the data success rate and two constants, where the constants are dependent on the media access control (MAC) protocol used while operating in the given communication mode. For example, the metric value may be identified using the Equation 1:

$$\text{Metric} = (C_1 + C_2(M))^{1/D(M)} \qquad \text{Equation 1}$$

In equation 1, $C_1$ and $C_2$ are the constants, M is the communication mode, and D(M) is the data success rate for communication mode M. Each of the constants $C_1$ and $C_2$ are adjusted based on the effectiveness of the values used, and the resulting communications in the communication network. For example, mode change application 242 included in node device 304 could initially set the value for $C_1$ as 4 milliseconds (ms) and the value for $C_2$ as 8 ms for a 300 kbps bandwidth, or 24 ms for a 100 kbps bandwidth.

In some embodiments, mode change application 242 may identify the metric value using an additional, third constant, $C_3$, representative of a backoff time, such as 20 ms. In such an embodiment, the metric value may be identified using Equation 2:

$$\text{Metric} = (C_1 + C_2(M))^{1/D(M)} + C_3\left(2^{\left(\frac{1}{D(M)}-1\right)} - 1\right) \qquad \text{Equation 2}$$

In some embodiments, mode change application 242 may compute the metric using a data rate for the communication mode, such as using Equation 3, where BPS(M) is the data rate for communication mode M:

$$\text{Metric} = 1/(D(M)*BPS(M)) \quad \text{Equation 3}$$

Upon computing the metrics values for the supported modes, mode change application 242 then selects one or more preferred communication modes for future communications. For example, mode change application 242 could compare metric values associated with each respective communication mode included in a common mode set, where each mode included in the common mode set is a communication mode supported by both node device 304 and node device 302. Mode change application 242 could then, based on the comparison of metric values select one or more communication modes from the common mode set to generate a selected mode set, where at least one communication mode in the selected mode set is a preferred communication mode that is to be used for transmitting data packets between node device 304 and node device 302.

In some embodiments, mode change application 242 may select a supported communication mode associated with the lowest metric value that is identified. For example, mode change application 242 could select as the preferred communication mode may the communication mode that yields the lowest metric value. In instances where each of node device 304 and node device 302 separately identify different communication modes at the preferred communication mode, node devices 302, 304 could determine that the communication node device that initiates the communication (e.g., node device 304) selects the communication mode for communication link 312.

In various embodiments, communication node device 304 may switch among communication modes when communicating with various node devices 302, 306 in network 300. For example, mode change application 242 could select a first communication mode (e.g., a mode with a 1 Megabit-per-second (Mbps) data rate) for communication link 312 and a second communication mode (e.g., a mode with a 300 kbps data rate) for communication link 314. This could occur, for example, when node device 302 is a newer node device that supports multiple communication modes with higher operating parameters, while node device 306 is a legacy node devices that supports fewer communication modes than node device 302, such as only supporting operating in the default mode. In such instances, node device 304 may support transmission of packets respectively, over communication links 312, 314 using different communication modes.

Once the discovery process has completed, node device 304 initiates normal operations. In the course of normal operations, node device 304 implements channel hopping across a repeating sequence of time slots. While channel hopping, node device 304 transmits and/or receives data at specific times within these time slots. In some embodiments, node device 304 may switch to a different communication mode. In such instances, node device 304 may operate using the currently-selected communication mode ("current mode"), where communication link 312 uses a specific channel plan for the current mode. In various embodiments, the current mode may be source-specific and/or destination-specific. In various embodiments, mode change application 242 may determine to switch from the current mode to a preferred communication mode to transfer data packets. In some embodiments, mode change application 242 may also determine to switch back to either the current mode or the default mode once the data packets are transferred. In such instances, mode change application 242 may send a message to node device 302 that specifies the sequence switches that are to occur such that node device 302 switches to the applicable mode when communicating with node device 304.

In various embodiments, node device 304 may update the preferred communication modes used for communication links 312 with neighboring communication node devices 302, 304. For example, communication node device 304 could, for each supported mode, update the data success rate, recalculate the metric values, and/or reselect the preferred communication mode for each respective communication link 312, 314. In some embodiments, mode change application 242 included in node device 304 may periodically perform updates, such as at a regular interval, or upon receiving instructions from back office system 310. In some embodiments, mode change application 242 may perform updates any time the data success rate for a given communication mode is updated, which may occur following any data message exchange with any neighboring communication node device (e.g., node device 302 and/or node device 306).

In some embodiments, mode change application 242 may employ various techniques to prevent rapid switching of communication modes and/or reselection of a preferred communication mode. For example, mode change application 242 could apply one or more filtering techniques, such as using infinite impulse response (IIR) filtering, where the success rate for each communication mode may be IIR filtered as using a specific alpha value (e.g., an alpha value between 0.90 and 0.95).

In various embodiments, mode change application 242 may employ hysteresis, such as by requiring that a new preferred mode performs better (e.g., based on comparing metric value) than the currently-selected preferred communication mode by a at least pre-determined amount (e.g., at least 10% better) in order to reselect the preferred communication mode. Additionally or alternatively, mode change application 242 may employ time gating, such as by requiring that a preferred communication mode is used for a given communication link 312 for at least a predetermined period of time before mode change application 242 is permitted select a new preferred mode.

In some embodiments, the initiator (e.g., node device 304) of communication between two communication node devices 302, 304 may select the communication mode and channel to be used for the transmission of data packets. In another embodiment, the transmitter of a data message (e.g., node device 302) may select the communication mode and channel for the next packet that it transmits. In other embodiments, the recipient (e.g., node device 306) of a packet may select the communication mode and channel that the neighboring communication node device (e.g., node device 304) should use for its next transmission over the applicable communication link 314.

In various embodiments, mode change application 242 may compute probabilities in order to determine whether an alternative communication mode is to be used in place of the preferred communication mode. For example, mode change application 242 could store, as entries in a local mode table, probabilities for each communication that reflect the likelihood that an alternate communication mode is tested when the given communication mode is preferred.

In some instances, the probability computed for a given communication mode could be based on the data success rate and/or metric value for that mode; alternatively, the probability could be specified by back office system 310. In such instances, when a new communication is to be transmitted or received, communication node device 304 could perform a check to see if the alternate mode is to be tested based on the probability of the preferred communication mode. In some embodiments, when a new communication mode is being tested, the initial message may be a poll-acknowledge transaction, where the neighboring communication node device 302 is to send the acknowledge message using the default mode, such as to mitigate the possibility of the alternate communication mode failing later communications.

In some embodiments, the alternate mode may be selected at random. Alternatively, the alternate mode may be cycled through such that each potential communication mode is attempted before one is repeated. In some embodiments, the alternate mode selected for testing may be the mode with the next best metric value. Additionally or alternatively, the alternate mode selected for testing may be the communication mode most-similar to the preferred communication mode (e.g., the mode with the highest quantity of equivalent operating parameters).

In some embodiments, mode change application 242 may use multiple values for the probability of testing an alternate mode. In such instances, mode change application 242 may use an "aggressive mode" evaluation and a "normal mode" evaluation. The normal mode may be used by the communication node device 304 unless metric values or other data (e.g., data success rates) begins to change significantly (e.g., faster than a preset threshold), at which time, the aggressive mode evaluation may be used. For example, the communication mode may use a moving average convergence divergence (MACD) of the probability using two validation states: one slow and one fast. If the fast metric deviates from the slow metric by a pre-determined amount, mode change application 242 may use the aggressive mode evaluation until the deviation has lowered, at which time, mode change application 242 uses the normal mode evaluation.

In some embodiments, mode change application 242 may remove from the local mode table any communication mode that is not supported by any neighboring communication node device. For example, once communication node device 304 completes discovery with all neighboring node devices, mode change application 242 could identify in the local mode table any communication mode that is not supported by any of the neighboring node devices 302, 304. In such instances, mode change application 242 could remove such communication modes from the local mode table. In some instances, mode change application 242 could add or rearrange the remaining modes in the mode table using any suitable criteria, such as based on signal-to-noise ratio (SNR).

Figure 4A:
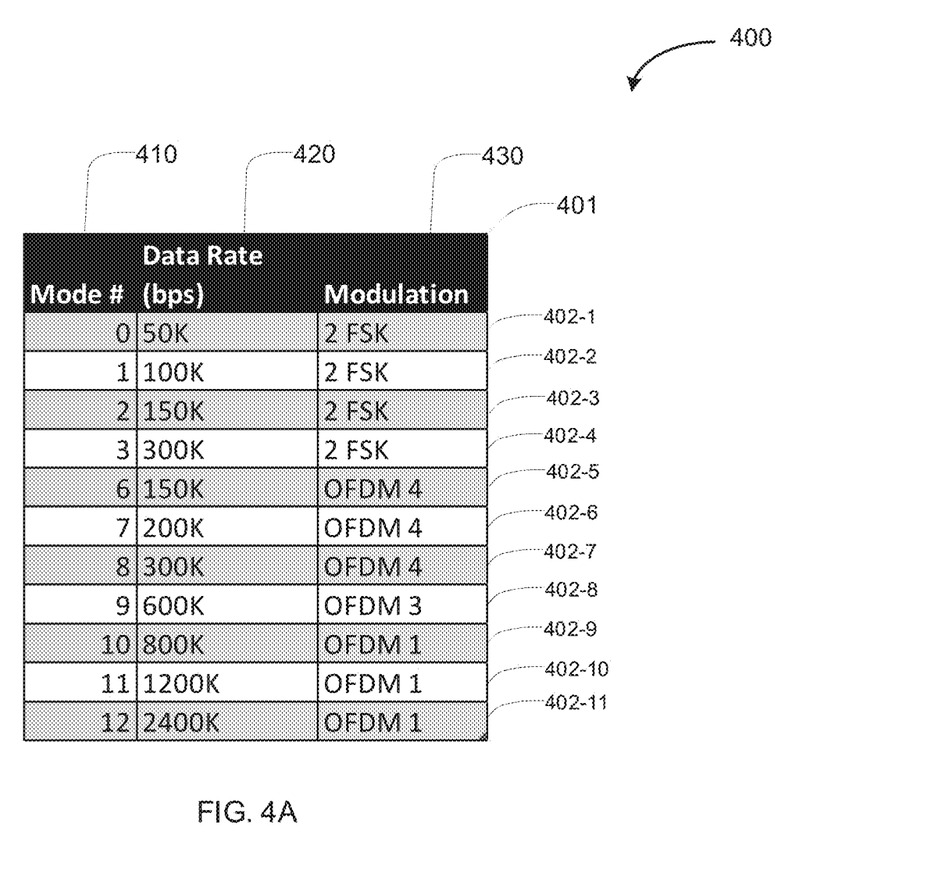
FIG. 4A illustrates the contents of a capabilities information element generated by a node device within the network system of FIG. 1, according to various embodiments.

FIG. 4A illustrates contents of a capabilities information element generated by a node device within the network system of FIG. 1, according to various embodiments. As shown, capabilities information element (IE) 400 includes mode table 401 that includes mode identifier field 410, data rate field 420, and modulation field 430. Mode table 401 includes a plurality of entries for specific communication modes 402 (e.g., 402-1 to 402-11).

In operation, a node device (e.g., node device 112, 114, 116, 210, 302, 304, 306, etc.) includes one or more capabilities information elements (IEs) in a message that is received by other node devices within the PAN. In various embodiments, mode change application 242 may include capabilities IE 400 and/or mode table 401 in one or more configuration frames (e.g., a PAN configuration frame) that is received by neighboring node device 302. Additionally or alternatively, mode change application 242 may include capabilities IE 400 and/or mode table 401 in discovery frames or discovery messages that are transmitting during the discovery phase. Similarly, a node device may receive a discovery frame or discovery message from one or more neighboring node devices that includes a capabilities IE associated with the neighboring node device. In various embodiments, node device 304 may extract the capabilities IE from a received message and mode change application 242 may compare the contents of capabilities IE 400 and/or mode table 401 to a locally-stored mode table. In various embodiments, mode change application 242 may update the locally-stored mode table to reflect the set of communication modes that are supported by neighboring node devices.

Capabilities IE 400 specifies details of each communication mode that is supported by a given node device. In various embodiments, mode change application 242 may, based on each capabilities IE 400, update a local mode table to reflect the communication modes supported by each neighboring node device. Mode change application 242 may then generate a common mode set for a neighboring node device in order to determine a preferred mode when data packets are transmitted between the node device and the neighboring node device.

In various embodiments, the discovery phase is a specific period known to each node device. For example, node device 304 could include capabilities IEs 400 in a periodic discovery frame. In some embodiments, the discovery phase may be a specific state. For example, the discovery phase could be a specific state, such as a join state 1 or a join state 3, that enables multi-data-rate communication between node device 304 and a neighboring node device 302. During the discovery phase, node device 304 may add one or more capabilities IEs 400 in the payload of messages that are transmitted to other node devices within network 300. Capabilities IE 400 describes the RF capabilities of node device 304. Similarly, neighboring node device 302 includes one or more capabilities IEs in messages that are received by node device 304, where such capabilities IEs describe the RF capabilities of neighboring node device 304.

In various embodiments, a given capabilities IE 400 describes modulations, data rates, channel spacing, and/or frequencies supported on node device 304. In such instances, when attempting to establish a communication link 312 with neighboring node device 302, node device 304 may refer to information included in the received capabilities IE 400 and/or the local mode table updated with information from the received capabilities IE 400 in order to identify additional communication modes that are available for linking to the linked device. In some embodiments, mode change application 242 may select a preferred communication mode from the communication modes that are listed in a received capabilities IE.

In some embodiments, capabilities IE 400 may be encoded as a bit string of a specified size (e.g., 64 bits), where a "1" in the bit string indicates support for a mode, and "0" indicates that a mode is not supported. For example, mode table 401 could be a mode data table included in capabilities IE 400 that indicates identifiers 410, the data rates 420 and modulation schemes 430 for different communication modes that are supported by node device 304. Other operating parameters (e.g., channel spacing, frequencies supported, etc.) and/or metric values associated with a given communication mode may also be included mode table 401.

In various embodiments, mode change application 242 may select the preferred communication mode based on one or more metrics. For example, mode change application 242 could select communication mode 402-11 as the preferred communication mode because the communication mode uses the highest data rate (e.g., 2.4 Mbps) when transferring data packets. In some embodiments, the channel plan in use by network 300 in which node device 304 is located may invalidate one or more modes included in mode table 401. In such instances, mode change application 242 could select a different communication mode supported by the channel plan, such as communication mode 402-4, which has operating parameters of a binary frequency-shift keying (2FSK) modulation scheme and a 300 Kbps data rate.

Figure 4B:
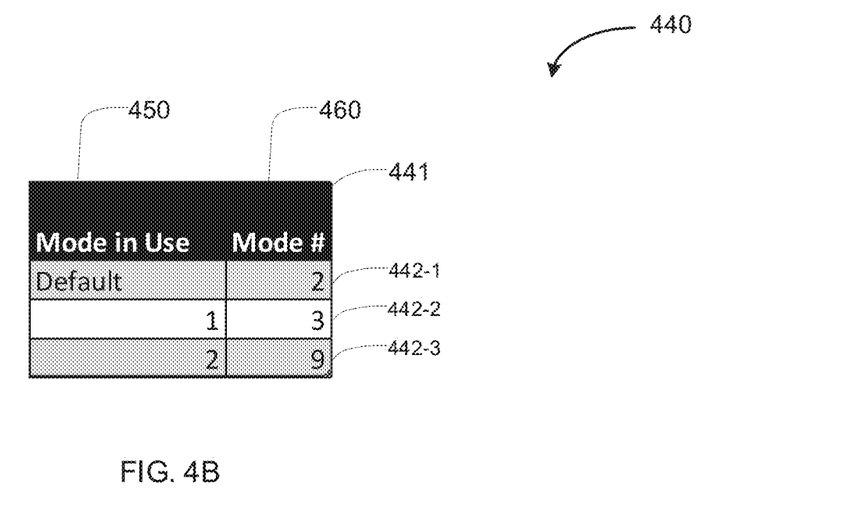
FIG. 4B illustrates contents a mode shift information element generated by a node device within the network system of FIG. 1, according to various embodiments.

FIG. 4B illustrates contents a mode shift information element generated by a node device within the network system of FIG. 1, according to various embodiments. As shown, mode shift information element (IE) 440 includes mode table 441 that has mode-in-use field 450 and mode identifier 460. Mode table 441 specifies a set of communication modes 442 (e.g., 442-1 to 442-3) that are to be used in a shift to transfer data packets between neighboring node devices.

In various embodiments, mode change application 242 may generate mode shift IE 440, which describes one or more RF modes and/or describes a channel plan that is to be used for multi-data-rate communication. For example, mode change application 242 could generate mode shift IE 440 for inclusion with data messages and acknowledgement frames in order to direct the a neighboring node device to switch to another preferred communication mode at the conclusion of processing a data message or processing an acknowledgement message. In such instances, the two node devices initially shift to the preferred communication mode and then switch to a separate communication mode that is not the default mode. Additionally or alternatively, the mode shift IE may be included in an upper layer application data (ULAD) frame when targeting the linked node device.

In various embodiments, mode shift IE 440 may be included in a mode sampling frame transmitted by node device 304. For example, node device 304 may add a mode sampling frame in messages to the neighboring node device 302 in order to transition to a new communication mode for packet exchange and/or metric collection. In such instances, the mode sampling frame indicates that once the packet exchange and/or metric collection is complete, the neighboring node device is to transition back to the current mode employed by the linked node device when the linked node device received the mode sampling frame. In some embodiments, node device 304 may initiate mode sampling via unicast, where node device 304 transmits to neighboring node devices in default mode during a unicast listening schedule. In such instances, node device 304 may elect to use a mode sampling frame that includes mode shift IE 440. In such instances, node device 304 may target only neighboring node devices that have received capabilities IE 400 sent by node device 304.

In various embodiments, mode change application 242 may generate mode shift IE 440 that specifies a set of one or more selected communication modes and/or an associated channel plan. In some embodiments, mode change application 242 may select the set of supported communication modes from a common mode set of modes that are supported by both node device 304 and neighboring node device 302, where a received capabilities IE 400 specified the communication modes supported by neighboring node device 302.

In some embodiments, the set of selected modes as specified in mode shift IE 440 are legal in the channel plan such that each of the selected modes may be used as a group for communication link 312. In some embodiments, one of the selected RF modes may be the default mode for the PAN. In some embodiments, the default mode may be the same for all devices included in the PAN. Additionally or alternatively, the current mode may be the mode in use last. In such instances, mode change application 242 may select the remaining communication modes based on the capabilities of the neighboring node device, signal-to-noise (S/N) characteristics for the selected communication modes, and/or channel spacing. For example, node device 304 could retrieve metrics associated with a set of supported modes. In such instances, node device 304 could determine theoretical S/N characteristics for groupings of available communication modes in order to determine one or more communication modes to select.

In some embodiments, mode shift IE 440 may include an optional field (not shown) that indicates one of the selected modes that is to be used in a following mode sampling frame. As shown, for example, mode table 441 lists a set of supported modes that includes default mode 442-1, current mode 442-2, and preferred mode 442-3. Mode shift IE 440 could also include a field specifying that the node device is to switch to current mode 442-2. Neighboring node device 302, upon acknowledgement of receiving mode shift IE 440, switches from current mode 442-2 (e.g., where neighboring node device 302 is presently operating using the current mode) to preferred mode 442-3 for the transmission of data packets, then switches back to current mode 442-2.

In various embodiments, mode shift IE 440 may be included in a mode transition frame. For example node device 304 could add a mode transition frame in messages to neighboring node device 302 in order to switch to a new current mode, or switch to an existing current mode. When mode shift IE 440 is included in a mode transition frame, mode shift IE 440 lists the default mode, as well as a new current mode (or an existing current mode) to which neighboring node device 302 is to switch upon a transition. In some embodiments, node device 304 may initiate a mode transition via unicast, where node device 304 transmits the mode transition frame in default mode to neighboring node device 302 during a unicast listening schedule, and node device 304 elects to use the mode transition frame. In such instances, node device 304 may target only those neighboring node devices that have received capabilities IE 400 sent by node device 304.

In some embodiments, after transitioning to the new current mode (or existing current mode), the remaining exchange between node device 304 and neighboring node device 302, including acknowledgements and/or responses from neighboring node device 302, may continue in the new current mode. Such communications may continue until node device 304 transmits a final mode transition frame to neighboring node device 304, where the final mode transition frame indicates that neighboring node device 302 is to transition to the default mode. In some embodiments, the listening schedule of neighboring node device 302 may cause neighboring node device 302 to return to the default mode without receiving the final mode transition frame.

In some embodiments, node device 304 may send a mode sampling frame to neighboring node device 302 and may receive a response that includes metric values associated with the specific communication mode listed in mode shift IE 440. In such instances, both node device 304 and neighboring node device 302 will both return to default mode 442-1 upon exchange of the mode sampling frame and the response.

In various embodiments, mode change application 242 may generate a mode sampling metrics information element that provides metrics obtained from one or more mode sampling frames. For example, node device 304 may perform mode sampling as an ongoing process after a discovery phase (e.g., when capabilities IE 400 is detected and/or received). Node device 304 could collect various metric values in order to determine whether to change the current mode and/or reselect a preferred communication mode. For example, mode change application 242 could abstain from switching the current mode unless another mode provides an improvement of 25% or more.

In some embodiments, node device 304 may receive a mode sampling frame that directs node device 304 to switch to a specific communication mode at the conclusion of processing a data message and/or an acknowledgement message, where node device 304 is to sample the specific communication mode. In various embodiments, subsequent data messages may be directed to node device 304 using a preferred communication mode that corresponds to the specific communication mode. In such instances, node device 304 may sample the specific communication mode using one or more ULAD frames and/or may generate metric values for the specific mode. Node device 304 may then generate a response acknowledgement that includes the mode sampling metrics IE. The mode sampling metrics IE may include signal quality metrics, such as the received signal strength indicator (RSSI) of a received ULAD frame. In some embodiments, node device 304 may send the response acknowledgement in the specific communication mode that was sampled.

Figure 5:
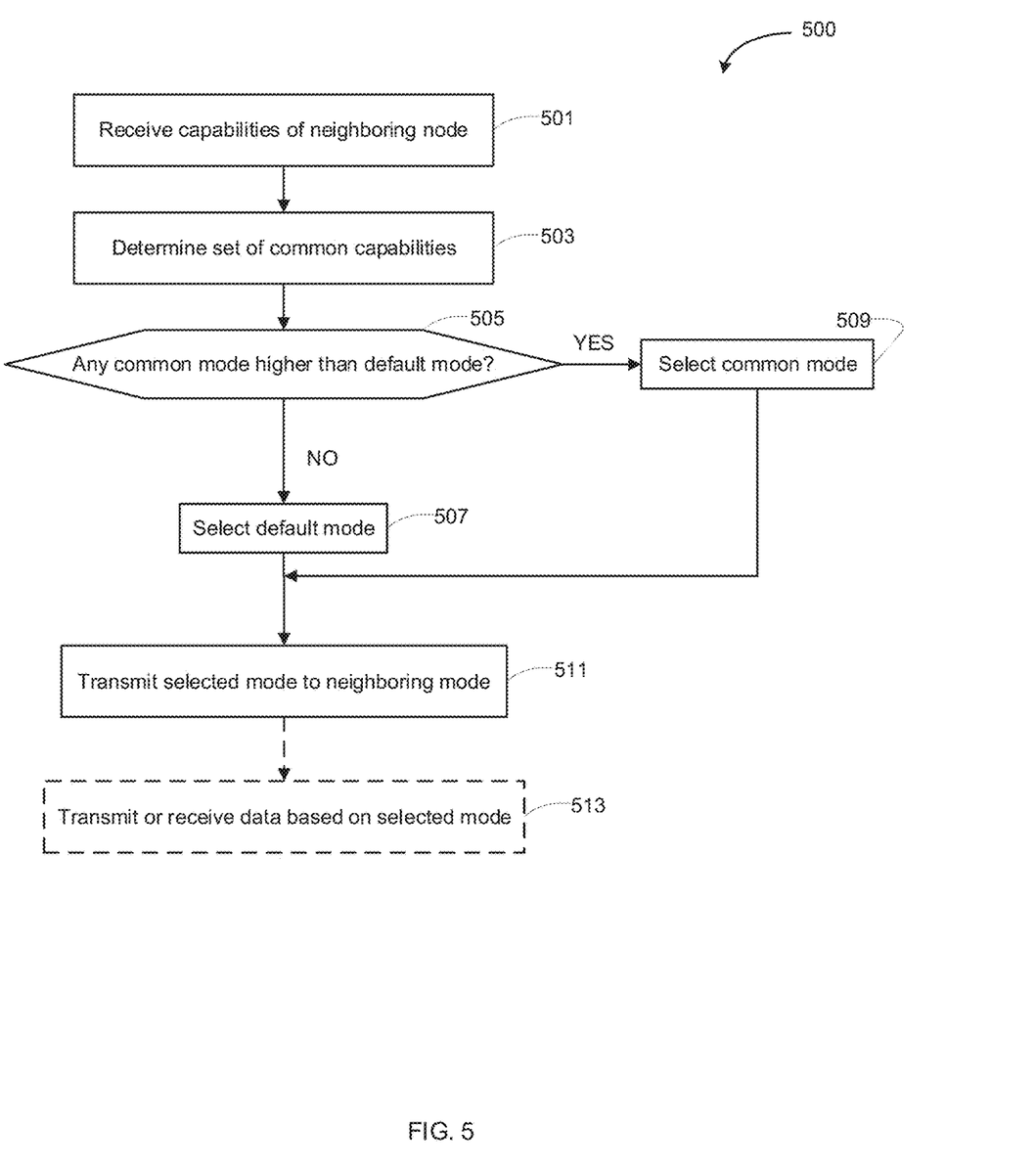
FIG. 5 is a flow diagram of method steps for transmitting data between node device devices in a network system, according to various embodiments.

FIG. 5 is a flow diagram of method steps for transmitting data between node device devices in a network system, according to various embodiments. Although the method steps are described with reference to the systems and call flows of FIGS. 1-4B, persons skilled in the art will understand that any system configured to implement the method steps, in any order, falls within the scope of the present disclosure.

Method 500 begins at step 501, where a node device 304 receives capabilities of a neighboring node device. Mode change application 242 included in node device 304 receives capabilities IE 400 originating from neighboring node device 302, where the capabilities specifies a set of communication modes that the neighboring node device 302 supports. In various embodiments, node device 304 may extract capabilities IE 400 from a message transmitted by neighboring node device 302. For example, node device 304 could receive a discovery frame and could extract capabilities IE 400 that includes mode table 441 that lists a set of communication modes supported by neighboring node device 302.

At step 503, node device 304 determines a set of common capabilities with the neighboring node device. Mode change application 242 compares the set of node devices supported by neighboring node device 302 with a set of communication modes supported by node device 304. In some embodiments, node device 304 may store a mode table that lists a set of communication modes that node device 304 supports for transferring data packets. In such instances, mode change application 242 may compare the set of communication modes supported by node device 304 with the set of communication modes supported by neighboring node device 302 to generate a common mode set.

In some embodiments, the communication modes included in a common mode set for a given neighbor may differ for each neighboring node device. For example, neighboring node device 302 could be a newer device that supports a large quantity of communication modes (e.g., twenty distinct modes). In such instances, mode change application 242 would generate a common mode set that includes a set of twelve communication modes that are supported by both node device 304 and neighboring node device 302. In another example, neighboring node device 306 could be a legacy device that only supports the default mode of network 300. In such instances, mode change application 242 would generate a common mode set that includes only one communication mode (e.g., the default mode).

At step 505, node device 304 determines whether there are any common modes between node device 304 and the neighboring node device that are higher than the default mode. Mode change application 242 analyzes the common mode set in order to determine whether node device 304 and neighboring node device 302 support any communication modes beyond the default mode. For example, the default mode could be a baseline communication mode, where all other communication modes incorporate improved operating parameters (e.g., higher data rates, more channels in a channel plan, more robust modulation scheme, etc.). In such instances, node device 304 could identify at least one communication mode in the common mode set that is not the default mode, where the at least one communication mode improves the transmission of data packets over a communication link. When mode change application 242 identifies at least one communication mode in the common mode set that is not the default mode, mode change application proceeds to step 509. Otherwise, mode change application 242 identifies only the default mode in the common mode set at proceeds to step 507.

At step 507, node device 304 selects the default mode. Mode change application 242, upon determining that only the default mode is supported by both node device 304 and neighboring node device 302 in step 505, selects the default mode for later transmission of data packets between node device 304 and node device 302. In such instances, both node device 304 and node device 302 remain in the default mode and, at a later time, use the default mode to transfer data packets via communication link 312.

At step 509, node device 304 selects at least one common mode above the default mode. Mode change application 242, upon identifying at least one communication mode that is supported by node device 304 and neighboring node device 302 in step 509, selects a set of one or more communication modes from the common mode set. For example, mode change application 242 could generate a common mode set of twelve communication modes that includes eleven communication modes with improved operating parameters when compared to the default mode. mode change application 242 could then select, from the set of eleven communication modes, a selected set of two communication modes to use for the transmission of data packets between node device 304 and neighboring node device 302. In such instances, mode change application 242 could also specify the sequence that the two communication modes are to be used. Node device 304 and node device 302 could then, based on the specified sequence, switch to the applicable communication modes when transferring data packets via communication link 312.

At step 511, node device 304 transmits a message specifying the selected mode to the neighboring node device.

Mode change application 242 generates mode shift IE 440 that specifies the modes that are to be used when transferring data packets between node device 304 and neighboring node device 302.

In various embodiments, mode change application 242 may generate mode shift IE 440 that specifies the set of communication modes that were selected for use to transfer data packets between node device 304 and neighboring node device 302. Mode change application 242 may then include mode shift IE 440 in a message and transmit the message to neighboring node device 302. In some embodiments, the mode transition frame or a mode sampling frame that indicates the communication mode to be used after the data packets have been transferred. In such instances, neighboring node device 302 analyzes the contents of mode shift IE 440 that is included in the mode transition frame or mode sampling frame in order to identify the applicable communication mode.

In other embodiments, when mode change application 242 selects the default mode for use during the transfer of data packets, mode change application 242 may refrain from generating a message. In such instances, both node device 304 and neighboring node device 302 remain in the default mode.

At step 513, node device 304 and neighboring node device 302 may optionally transmit data packets using the selected communication mode. In various embodiments, upon node device 304 transmitting a message that includes mode shift IE 440 in the payload, neighboring node device 302 may schedule to switch to the one or more communication modes specified in mode shift IE 440 in order to facilitate the transfer of data packets between node device 304 and neighboring node device 302. For example, neighboring node device 302 could be a sender that switches from the default mode to a communication mode specified in mode shift IE 440 in order to transfer data packets to node device 304 using the applicable communication mode. In another example, neighboring node device 302 may be a recipient that switches to the communication mode specified in mode shift IE 440 in order to receive one or more data packets from node device 304. Once all the data packets are transferred, node device 304 and neighboring node device 302 may then switch to a different communication mode, as specified in mode shift IE 440.

In sum, a mode control application in a communication node device of a mesh network receives a message from a neighboring node device attempting to establish a communication link. The received message includes a capabilities information element (IE). The capabilities IE includes a mode table that specifies operating parameters for each communication mode that the neighboring device supports. Each entry in the mode table includes one or more mode operating parameters for a particular communication mode, such as a data rate, modulations, channel spacing, and/or frequency of the communication mode. A communication mode is either the default mode that used by each node device in the mesh network, or a different mode that has different operating parameters than the default mode.

The mode control application compares each of the entries listed in the capabilities IE to a stored list of communication modes supported by the communication node device and determines a set of common communication modes that are supported by both node devices. Upon determining the common mode set, the mode control application selects, from the common mode set, a set of one or more selected modes to use for data communications with the neighboring mode.

The mode control application then generates a message that specifies the selected mode. In various embodiments, the mode control application may generate a mode shift IE or mode sampling IE that specifies supported modes that are to be used when transmitting data packets. The mode control application causes the communication node device to transmit the message to the neighboring node device. After transmitting the message, the communication node device and the neighboring node device transmit one or more data packets using the mode parameters of the selected communication mode.

One technological advantage of the disclosed approach relative to the prior art is that newer node devices with higher operating capabilities are able to dynamically adjust the communications mode being used to connect to other nodes within the network. In particular, a given node device is able to adjust the communication mode used to connect to a neighboring node device based on the capabilities of the neighboring node device. a node device with greater operating capabilities is able to establish a communication link with a similar node device and transmit data according to those greater operating capabilities and is able to establish a communication link with a legacy node device having lesser operating capabilities and transmit data according to those lesser operating capabilities. Accordingly, the overall operating efficiency of the mesh network can be substantially increased relative to conventional mesh networks.

Further, by communicating operating capabilities and the selection of particular communication modes through information elements that are recognizable to each node device in the mesh network, a given pair of node devices within the mesh network are able to efficiently share information about communication modes without requiring legacy node devices to recognize new header formats. Enabling such efficient shifting of communication modes enables newer devices to communicate in the most efficient manner, while also maintaining compatibility with legacy devices. These technical advantages provide one or more technological improvements over prior art approaches.

1. In some embodiments, a computer-implemented method for transmitting data between node devices in a mesh network includes receiving, by a first node device within the mesh network that supports a first set of communication modes, a first information element that specifies a second set of communication modes supported by a second node device within the mesh network, determining, based on the first information element, a common set of communication modes that includes at least a default mode and a first mode, where each communication mode included in the common set of communication modes is supported by both the first node device and the second node device, selecting, from the common set of communication modes, the first mode as a first preferred communication mode for data transmissions between the first node device and the second node device, and configuring a communication link between the first node device and the second node device according to the first mode.

2. The computer-implemented method of clause 1, further comprising transmitting a first data packet from the first node device to the second node device via the communication link.

3. The computer-implemented method of clause 1 or 2, further comprising generating a selection message that specifies the first mode, and transmitting the selection message to the second node device.

4. The computer-implemented method of any of clauses 1-3, where the selection message includes a first mode shift information element that includes at least: a first entry specifying the default mode, and a second entry specifying the first mode.

5. The computer-implemented method of any of clauses 1-4, where the first mode configures the communication link after transmitting the selection message.

6. The computer-implemented method of any of clauses 1-5, where the selection message includes a first mode shift information element that includes at least a first entry specifying the default mode, a second entry specifying the first mode, and a third entry specifying a second mode as a second preferred mode.

7. The computer-implemented method of any of clauses 1-6, where the first node device configures the communication link after transmitting the selection message, and the first node device, after transmitting the first data packet, reconfigures the communication link according to the second mode.

8. The computer-implemented method of any of clauses 1-7, where the first information element includes a first entry specifying a first set of operating parameters that includes a first data rate associated with the default mode, and a second entry specifying a second set of operating parameters that includes a second data rate associated with the first mode, wherein the second data rate is higher than the first data rate.

9. The computer-implemented method of any of clauses 1-8, where each of the first set of operating parameters and each of the second set of operating parameters further include at least one of: a modulation scheme, a channel spacing group, or a set of supported frequencies.

10. The computer-implemented method of any of clauses 1-9, where selecting the first mode as the first preferred communication mode comprises comparing at least a first operating parameter included in the first set of operating parameters to at least a second operating parameter included in the second set of operating parameters, determining that the second operating parameter is greater than the first operating parameter, and in response to determining that the second operating parameter is greater than the first operating parameter, selecting the first mode as the first preferred communication mode.

11. The computer-implemented method of any of clauses 1-11, where the first information element is received from the second node device in an encrypted message, and further comprising decrypting the encrypted message to access the first information element.

12. In some embodiments, one or more non-transitory computer-readable storage media store instructions that, when executed by one or more processors, cause the one or more processors to transmit data between node devices in a mesh network by performing the steps of receiving, by a first node device within the mesh network that supports a first set of communication modes, a first information element that specifies a second set of communication modes supported by a second node device within the mesh network, determining, based on the first information element, a common set of communication modes that includes at least a default mode and a first mode, where each communication mode included in the common set of communication modes is supported by both the first node device and the second node device, selecting, from the common set of communication modes, the first mode as a first preferred communication mode for data transmissions between the first node device and the second node device, and configuring a communication link between the first node device and the second node device according to the first mode.

13. The one or more non-transitory computer-readable storage media of clause 12, further storing instructions that, when executed by the one or more processors, cause the one or more processors to further perform the step of transmitting a first data packet from the first node device to the second node device via the communication link.

14. The one or more non-transitory computer-readable storage media of clause 12 or 13, further storing instructions that, when executed by the one or more processors, cause the one or more processors to further perform the steps of transmitting a transition message that specifies a switch from the first mode to the default mode, and upon transmitting the transition message, reconfiguring the communication link according to the default mode.

15. The one or more non-transitory computer-readable storage media of any of clauses 12-14, further storing instructions that, when executed by the one or more processors, cause the one or more processors to further perform the steps of after transmitting the first data packet, reconfiguring the communication link according to a second mode, where the first mode has at least one operating parameter that is higher than the default mode and lower than the first mode, and transmitting a second data packet from the first node device to the second node device via the communication link.

16. The one or more non-transitory computer-readable storage media of any of clauses 12-15, further storing instructions that, when executed by the one or more processors, cause the one or more processors to further perform the steps of after transmitting the first data packet, reconfiguring the communication link according to the default mode.

17. The one or more non-transitory computer-readable storage media of any of clauses 12-16, further storing instructions that, when executed by the one or more processors, cause the one or more processors to further perform the steps of generating a selection message that specifies the first mode, and transmitting the selection message to the second node device.

18. In some embodiments, a system includes a first node device that resides within a mesh network and supports a first set of communication modes, a second node device that resides within the mesh network and supports a second set of communication modes, and a communication link between the first node device and the second node device, wherein the first node device performs the steps of receiving a first information element that specifies the second set of communication modes supported by a second node device within the mesh network, determining, based on the first information element, a common set of communication modes that includes at least a default mode and a first mode, where each communication mode included in the common set of communication modes is supported by both the first node device and the second node device, selecting, from the common set of communication modes, the first mode as a first preferred communication mode for data transmissions between the first node device and the second node device, and configuring a communication link between the first node device and the second node device according to the first mode.

19. The system of clause 18, where the first node device includes a memory that stores a mode change application, a first set of operating parameters associated with the default mode, and a second set of operating parameters associated with the first mode; and a processor that executes the mode change application to select the first mode as the first preferred communication mode by performing the steps of comparing at least a first operating parameter included in the first set of operating parameters to at least a second operating parameter included in the second set of operating parameters, determining that the second operating parameter is greater than the first operating parameter, and in response to determining that the second operating parameter is greater than the first operating parameter, selecting the first mode as the first preferred communication mode.

20. The system of clause 18 or 19, where the first node device further performs the steps of generating a selection message that specifies the first mode, and transmitting the selection message to the second node device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   receiving, by a first node device within a mesh network that supports a first set of communication modes, a first information element that specifies a second set of communication modes supported by a second node device within the mesh network;
   determining, based on the first information element, a common set of communication modes that includes at least a default mode and a first mode, wherein each communication mode included in the common set of communication modes is supported by both the first node device and the second node device;
   selecting, from the common set of communication modes, the first mode as a first preferred communication mode for data transmissions between the first node device and the second node device; and
   configuring a communication link between the first node device and the second node device according to the first mode.

2. The method of claim 1, further comprising transmitting a first data packet from the first node device to the second node device via the communication link.

3. The method of claim 2, further comprising:
   generating a selection message that specifies the first mode; and
   transmitting the selection message to the second node device.

4. The method of claim 3, wherein the selection message includes a first mode shift information element that includes at least:
   a first entry specifying the default mode; and
   a second entry specifying the first mode.

5. The method of claim 4, wherein the first node device configures the communication link after transmitting the selection message.

6. The method of claim 3, wherein the selection message includes a first mode shift information element that includes at least:
   a first entry specifying the default mode;
   a second entry specifying the first mode; and
   a third entry specifying a second mode as a second preferred mode.

7. The method of claim 6, wherein:
   the first node device configures the communication link after transmitting the selection message; and
   the first node device, after transmitting the first data packet, reconfigures the communication link according to the second mode.

8. The method of claim 1, wherein the first information element includes:
   a first entry specifying a first set of operating parameters that includes a first data rate associated with the default mode; and
   a second entry specifying a second set of operating parameters that includes a second data rate associated with the first mode, wherein the second data rate is higher than the first data rate.

9. The method of claim 8, wherein each of the first set of operating parameters and each of the second set of operating parameters further include at least one of: a modulation scheme, a channel spacing group, or a set of supported frequencies.

10. The method of claim 8, wherein selecting the first mode as the first preferred communication mode comprises:
    comparing at least a first operating parameter included in the first set of operating parameters to at least a second operating parameter included in the second set of operating parameters;
    determining that the second operating parameter is greater than the first operating parameter; and
    in response to determining that the second operating parameter is greater than the first operating parameter, selecting the first mode as the first preferred communication mode.

11. The method of claim 1, wherein the first information element is received from the second node device in an encrypted message, and further comprising decrypting the encrypted message to access the first information element.

12. One or more non-transitory computer-readable storage media storing instructions that, when executed by one or more processors, cause the one or more processors to perform the steps of:
    receiving, by a first node device within a mesh network that supports a first set of communication modes, a first information element that specifies a second set of communication modes supported by a second node device within the mesh network;
    determining, based on the first information element, a common set of communication modes that includes at least a default mode and a first mode, wherein each communication mode included in the common set of communication modes is supported by both the first node device and the second node device;
    selecting, from the common set of communication modes, the first mode as a first preferred communication mode for data transmissions between the first node device and the second node device; and
    configuring a communication link between the first node device and the second node device according to the first mode.

13. The one or more non-transitory computer-readable storage media of claim 12, further storing instructions that, when executed by the one or more processors, cause the one or more processors to further perform the step of transmitting a first data packet from the first node device to the second node device via the communication link.

14. The one or more non-transitory computer-readable storage media of claim 13, further storing instructions that, when executed by the one or more processors, cause the one or more processors to further perform the steps of:
    transmitting a transition message that specifies a switch from the first mode to the default mode; and
    upon transmitting the transition message, reconfiguring the communication link according to the default mode.

15. The one or more non-transitory computer-readable storage media of claim 13, further storing instructions that, when executed by the one or more processors, cause the one or more processors to further perform the steps of:
    after transmitting the first data packet, reconfiguring the communication link according to a second mode, wherein the first mode has at least one operating parameter that is higher than the default mode and lower than the first mode; and
    transmitting a second data packet from the first node device to the second node device via the communication link.

16. The one or more non-transitory computer-readable storage media of claim 13, further storing instructions that, when executed by the one or more processors, cause the one or more processors to further perform the steps of:
    after transmitting the first data packet, reconfiguring the communication link according to the default mode.

17. The one or more non-transitory computer-readable storage media of claim 12, further storing instructions that, when executed by the one or more processors, cause the one or more processors to further perform the steps of:
    generating a selection message that specifies the first mode; and
    transmitting the selection message to the second node device.

18. A system, comprising:
    a first node device that resides within a mesh network and supports a first set of communication modes;
    a second node device that resides within the mesh network and supports a second set of communication modes; and
    a communication link between the first node device and the second node device,
    wherein the first node device performs the steps of:
       receiving a first information element that specifies the second set of communication modes supported by the second node device within the mesh network,
       determining, based on the first information element, a common set of communication modes that includes at least a default mode and a first mode, wherein each communication mode included in the common set of communication modes is supported by both the first node device and the second node device,
       selecting, from the common set of communication modes, the first mode as a first preferred communication mode for data transmissions between the first node device and the second node device, and configuring the communication link between the first node device and the second node device according to the first mode.

19. The system of claim 18, wherein the first node device includes:
   a memory that stores:
      a mode change application,
      a first set of operating parameters associated with the default mode, and
      a second set of operating parameters associated with the first mode; and
   a processor that executes the mode change application to select the first mode as the first preferred communication mode by performing the steps of:
      comparing at least a first operating parameter included in the first set of operating parameters to at least a second operating parameter included in the second set of operating parameters;
      determining that the second operating parameter is greater than the first operating parameter; and
      in response to determining that the second operating parameter is greater than the first operating parameter, selecting the first mode as the first preferred communication mode.

20. The system of claim 18, wherein the first node device further performs the steps of:
   generating a selection message that specifies the first mode; and
   transmitting the selection message to the second node device.

* * * * *